(12) United States Patent
Lee et al.

(10) Patent No.: US 12,547,284 B2
(45) Date of Patent: Feb. 10, 2026

(54) FLEXIBLE TOUCH SENSOR (71) Applicant: AMOGREENTECH CO., LTD., Gimpo-si (KR)

(72) Inventors: Hyo-Jung Lee, Gimpo-si (KR); Geunyoung Jang, Gimpo-si (KR); Seayoung Lim, Gimpo-si (KR); Gyu Min Lee, Gimpo-si (KR); In-Yong Seo, Gimpo-si (KR); Jin Han Kim, Gimpo-si (KR); Kyung Su Kim, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 0 days.

(21) Appl. No.: 18/835,712

(22) PCT Filed: Feb. 3, 2023

(86) PCT No.: PCT/KR2023/001586
§ 371 (c)(1),
(2) Date: Aug. 2, 2024

(87) PCT Pub. No.: WO2023/149749
PCT Pub. Date: Aug. 10, 2023

(65) Prior Publication Data
US 2025/0147629 A1    May 8, 2025

(30) Foreign Application Priority Data
Feb. 3, 2022 (KR) .......................... 10-2022-0014101

(51) Int. Cl.
*G06F 3/044* (2006.01)
(52) U.S. Cl.
CPC .. *G06F 3/0445* (2019.05); *G06F 2203/04102* (2013.01)

(58) Field of Classification Search
CPC ................. G06F 3/0445; G06F 2203/04102
See application file for complete search history.

(56) References Cited

U.S. PATENT DOCUMENTS 8,105,126 B2 * 1/2012 Jiang ...................... B82Y 20/00
445/24
2010/0271328 A1  10/2010 Sekiguchi et al.
(Continued)

FOREIGN PATENT DOCUMENTS

JP        2013-97932 A      5/2013
JP        2017-194960 A     10/2017
(Continued)

OTHER PUBLICATIONS

International Search Report for PCT/KR2023/001586 by Korean Intellectual Property Office dated May 22, 2023.
(Continued)

*Primary Examiner* — Jonathan A Boyd
(74) *Attorney, Agent, or Firm* — BROADVIEW IP LAW, PC (57)  ABSTRACT

The present invention can provide a flexible touch sensor including: a body in which a first circuit pattern layer, a first nanoweb layer, a base layer, a second nanoweb layer, and a second circuit pattern layer are disposed to be sequentially stacked; a flexible circuit board connected to any one of the first and second circuit pattern layers of the body; and a connection part connecting the body and the flexible circuit board, wherein the connection part includes an anisotropic conductive film, and wherein when wound around a cylindrical mandrel with a diameter of 4 mm, a crack having a length of 3 mm or more does not occur, whereby the flexible touch sensor has excellent flexibility and can be transformed into various shapes.

13 Claims, 4 Drawing Sheets

(56) References Cited

U.S. PATENT DOCUMENTS

| | | |
|---|---|---|
| 2012/0075243 A1 | 3/2012 | Doi et al. |
| 2014/0299360 A1* | 10/2014 | Yoshida ................ G06F 3/0445 |
| | | 174/251 |
| 2017/0300147 A1* | 10/2017 | Tomita .................... G06F 3/047 |
| 2017/0308193 A1* | 10/2017 | Wu ....................... G06F 3/0412 |
| 2018/0194963 A1* | 7/2018 | Kim ......................... C09D 5/16 |
| 2018/0208793 A1* | 7/2018 | Kim .................... C09D 175/06 |
| 2018/0300006 A1 | 10/2018 | Lim et al. |
| 2018/0356303 A1 | 12/2018 | Li et al. |

FOREIGN PATENT DOCUMENTS

| | | | | |
|---|---|---|---|---|
| JP | 2018-169962 A | | 11/2018 | |
| KR | 10-2015-0138472 A | | 12/2015 | |
| KR | 20150138472 | * | 12/2015 | |
| KR | 10-2017-0016300 A | | 2/2017 | |
| KR | 10-2017-0092048 A | | 8/2017 | |
| KR | 20170092048 | * | 8/2017 | ............... G01L 5/00 |

OTHER PUBLICATIONS

Office Action for KR 10-2022-0014101 by Korean Intellectual Property Office dated Feb. 10, 2025.
Extended European Search Report for EP 237499827 by European Patent Office dated Dec. 8, 2025.

* cited by examiner

FLEXIBLE TOUCH SENSOR

TECHNICAL FIELD

The present invention relates to a flexible touch sensor.

BACKGROUND ART

With the development of electronic components such as semiconductors, various wearable electronic devices are emerging. Traditional types of electronic devices typically include a touch sensor for operation, and this touch sensor has been integrated with a display and used in the form of a touch screen. On the other hand, recent electronic devices are being differentiated into various types of wearable devices, and accordingly, various types of touch sensors are required.

The touch sensor can detect an input using a resistive type, a capacitive type, an optical type, and the like, and displays a touch position by calculating coordinates based on a change in the capacitance value of each electrode line caused by the touch of a conductor through the electrode.

However, the capacitive type touch sensor can recognize the touch position on a plane, but it has a problem that it is difficult to detect a touch pressure. In addition, a flexible sensor is required to be applied to various types of electronic devices, but the capacitive type touch sensor generally uses cover glass, and thus has a limitation in applying it to various types of curved surfaces.

DISCLOSURE

Technical Problem

The present invention has been devised in consideration of the above points, and an object of the present invention is to provide a flexible touch sensor capable of detecting a change in touch pressure through a multilayer structure including a nanoweb layer.

In addition, another object is to provide a flexible touch sensor that can be applied to electronic devices of various shapes.

Technical Solution

In order to solve the above problems, the present invention provides a flexible touch sensor including: a body in which a first circuit pattern layer, a first nanoweb layer, a base layer, a second nanoweb layer, and a second circuit pattern layer are disposed to be sequentially stacked; a flexible circuit board connected to any one of the first and second circuit pattern layers of the body; and a connection part connecting the body and the flexible circuit board, wherein the connection part includes an anisotropic conductive film, and wherein when wound around a cylindrical mandrel with a diameter of 4 mm, a crack having a length of 3 mm or more does not occur.

In addition, the base layer may include at least one selected from polyimide(PI), polyethylene terephthalate (PET), polyethylene naphthalate(PEN), and polyurethane (PU).

Additionally, the average thickness of the base layer may be 20 µm or more and 100 µm or less.

Additionally, the first nanoweb layer and the second nanoweb layer may include nanofibers and conductive powders.

Additionally, the nanofibers may include at least one selected from polyacrylonitrile nanofibers, polyvinylidene fluoride nanofibers, and polyvinylidene fluoride-trifluoroethylene(P(VDF-TrFE)) random copolymer nanofibers.

Additionally, the average diameter of the nanofibers may be 0.1 µm or more and 2 µm or less.

Additionally, the average thickness of the first nanoweb layer and the second nanoweb layer may be 5 µm or more and 40 µm or less.

Additionally, the porosity of the first nanoweb layer and the second nanoweb layer may be 10% or more and 80% or less.

Additionally, the porosity of the first nanoweb layer and the second nanoweb layer may be 10% or more and 80% or less.

Additionally, the average thickness of the first circuit pattern layer and the second circuit pattern layer may be 0.1 µm or more and 20 µm or less.

In addition, the shape of the circuit pattern of the first circuit pattern layer may be different from the shape of the circuit pattern of the second circuit pattern layer.

In addition, a sponge layer disposed on the first circuit pattern layer may be further included.

In addition, a ground layer disposed on the sponge layer may be further included.

According to another embodiment of the present invention, the present invention provides a flexible touch sensor including: a body in which a base layer, a nanoweb layer, a circuit pattern layer, an upper sponge layer, and an upper ground layer are disposed to be sequentially stacked; a flexible circuit board connected to the circuit pattern layer of the body; and a connection part connecting the body and the flexible circuit board, wherein at least a portion of the flexible circuit board is disposed between the upper sponge layer and the circuit pattern layer, wherein the connection part includes an anisotropic conductive film, and wherein when wound around a cylindrical mandrel with a diameter of 4 mm, a crack having a length of 3 mm or more does not occur.

In addition, a lower sponge layer and a lower ground layer disposed under the base layer may be further included.

Additionally, the upper sponge layer may be disposed to completely cover the circuit pattern layer.

Advantageous Effects

According to the present invention, it is possible to provide a flexible touch sensor in which elastic recovery is facilitated by applying a flexible material including a nanoweb to a touch sensor having a stacked structure.

In addition, according to the present invention, it is possible to provide a flexible touch sensor that can be transformed into various shapes by increasing flexibility by applying an anisotropic conductive film to a connection part connecting a flexible circuit board and a sensor body.

BEST MODES OF THE INVENTION

Hereinafter, with reference to the accompanying drawings, embodiments of the present invention will be described in detail so as to be easily implemented by one of ordinary skill in the art to which the present invention pertains. The present invention may be embodied in a variety of forms and is not limited to the embodiments described herein. In order to clearly describe the present invention in the drawing, parts irrelevant to the description are omitted from the drawings; and throughout the specification, same or similar components are referred to as like reference numerals.

In the drawing, an X direction may be defined as a first direction, an L direction, or a length direction; a Y direction may be defined as a second direction, a W direction, or a width direction; and a Z direction may be defined as a third direction, a T direction, or a thickness direction.

Figure 1:
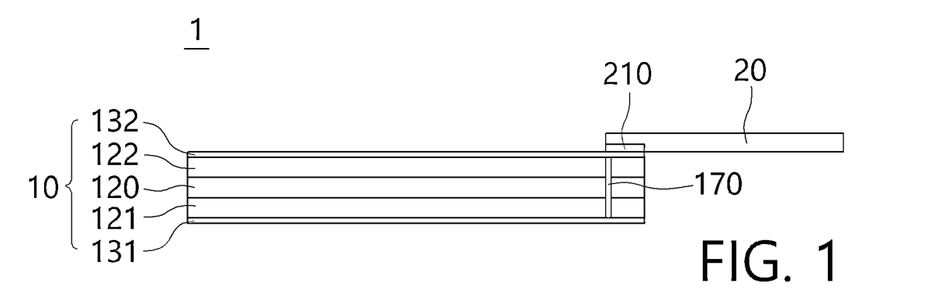
FIG. 1 is a cross-sectional view schematically illustrating a flexible touch sensor according to an embodiment of the present invention.

As illustrated in FIG. 1, a flexible touch sensor 1 according to one embodiment of the present invention includes: a body 10 in which a first circuit pattern layer 131, a first nanoweb layer 121, a base layer 110, a second nanoweb layer 122, and a second circuit pattern layer 132 are disposed to be sequentially stacked; a flexible circuit board 20 connected to any one of the first circuit pattern layer 131 and the second circuit pattern layer 132 of the body 10; and a connection part 210 connecting the body 10 and the flexible circuit board 20.

In this case, the connection part 210 may include an anisotropic conductive film. The anisotropic conductive film (ACF) may refer to a thermosetting or thermoplastic film including conductive balls dispersed therein.

Sensors that detect a general user's touch have developed around touch screens. This is because the development of smart devices has been centered around smartphones. A typical touch screen has a form in which a cover glass is bonded to a touch sensor equipped with transparent electrodes. A sensor equipped with such a touch screen has a limitation in implementing flexibility due to the presence of the cover glass.

In addition, as a form of not using the touch screen, a method using a physical button, an acceleration sensor, or the like has been used, but there was a problem in that a hard segment such as a circuit board or a soldering connection had to be used. In addition, in the case of a recently used capacitive sensor, an electrode pattern is attached to an area that requires touch sensing, and it is used in connection with a circuit module sealed in EMC molding, etc. However, even in the above form, the outer case has no choice but to function as a hard segment, and there is a possibility that problems such as short circuits may occur due to the long distance connected through the wire.

Accordingly, since the present invention does not include a rigid material such as a soldering part or a hard circuit board as described above, it can provide a flexible touch sensor with excellent flexibility and pliability. The flexible touch sensor according to the present invention may have flexibility to the extent that a crack having a length of 3 mm or more does not occur when wound around a cylindrical mandrel having a diameter of 4 mm. The flexibility may be a specific value according to the method of measurement standard JIS K5600-5-1.

That is, in the flexible touch sensor according to the present invention, almost all components included in the sensor are made of soft materials, so even if they are attached close to the surface of a stuffed doll or clothing, the touch feeling may not be adversely affected. In addition, as described later, by including a multi-layered structure including a nanoweb layer, excellent flexibility and high restoration properties can be implemented at the same time, and touch pressure can be detected in several stages.

Specifically, the first nanoweb layer 121 may be disposed toward the lower portion of the base layer 110 of the body 10 of the flexible touch sensor 1 according to the present invention, and the first circuit pattern layer 131 may be disposed below the first nanoweb layer 121. In addition, the second nanoweb layer 122 may be disposed above the base layer 110, and the second circuit pattern layer 132 may be disposed above the second nanoweb layer 122.

The base layer 110 may function to reinforce the strengths of the first nanoweb layer 121 and the second nanoweb layer 122, and may use various flexible materials. The base layer 110 may include at least one selected from polyimide(PI), polyethylene terephthalate(PET), polyethylene naphthalate (PEN), and polyurethane(PU), but is not limited thereto.

In this case, the average thickness of the base layer 110 may be 20 μm or more and 100 μm or less. When the average thickness of the base layer 110 is less than 20 μm, the support function for the nanoweb layer may be deteriorated, and thus durability and mechanical properties of the flexible touch sensor may be deteriorated. In addition, if the average thickness of the base layer 110 exceeds 100 μm, the process handling characteristics may deteriorate due to the excessive thickness, especially the bending characteristics may deteriorate due to the excessive thickness. Since the base layer 110 is disposed between the first nanoweb layer 121 and the second nanoweb layer 122 and has flexibility while being able to support the first nanoweb layer 121 and the second nanoweb layer 122, the flexible touch sensor according to the present invention can be attached to the surface of an object whose surface shape is easily changed due to low compressive strength like a stuffed doll.

Figure 3:
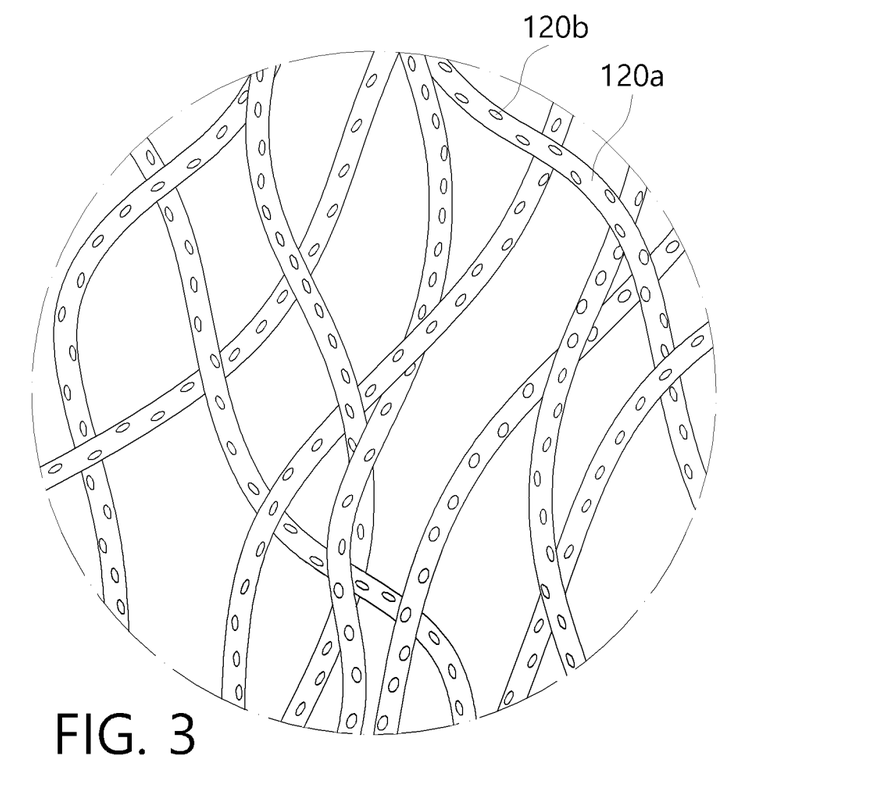
FIG. 3 is a diagram schematically illustrating the interior of a nanoweb layer applied to a flexible touch sensor according to an embodiment of the present invention.

For example, the first nanoweb layer 121 and the second nanoweb layer 122 disposed below and above the base layer 110 may include nanofibers 120a and conductive powder 120b (See FIG. 3). The flexible touch sensor 1 according to the present invention may include nanoweb layers 121 and 122, wherein the nanoweb layers 121 and 122 may have a structure in which a plurality of nanofibers 120a form a matrix structure, and conductive powder 120b is dispersed and disposed in the matrix structure. The present invention can detect the intensity of touch pressure by utilizing changes in elasticity of the first nanoweb layer 121 and the second nanoweb layer 122 when external pressure is applied. Specifically, the first nanoweb layer 121 and the second nanoweb layer 122 are prone to cause elastic changes by including pores as described later, so it may be possible to detect the intensity of pressure through the capacitance change value for pressure as described later.

The nanoweb layer may include nanofibers 120a manufactured by electrospinning a spinning solution containing a fiber-forming component, and may be formed by randomly accumulating a plurality of nanofibers 120a. For the nanoweb layer, any method of forming a fiber web having a three-dimensional network-shape by including nanofibers 120a may be used without limitation.

The fiber-forming component may include, depending on the purpose, at least one selected from the group consisting of polyurethane, polystyrene, polyvinylalchol, polymethyl methacrylate, polylactic acid, polyethyleneoxide, polyvinyl acetate, polyacrylic acid, polycaprolactone, polyacrylonitrile, polyvinylpyrrolidone, polyvinylchloride, polycarbonate (PC), polyetherimide, polyesthersulphone, polybenzimidazol, polyethylene terephthalate, polybutylene terephthalate, and fluorine-based compounds.

In addition, the fluorine-based compound may include at least one compound selected from the group consisting of polytetrafluoroethylene(PTFE)-based compounds, tetrafluoroethylene-perfluoroalkyl vinyl ether copolymer(PFA)-based compounds, tetrafluoroethylene-hexafluoropropylene copolymer(FEP)-based compounds, tetrafluoroethylene-hexafluoropropylene-perfluoroalkyl vinyl ether copolymer (EPE)-based compounds, tetrafluoroethylene-ethylene copolymer(ETFE)-based compounds, polychlorotrifluoroethylene(PCTFE)-based compounds, chlorotrifluoroethylene-ethylene copolymer(ECTFE)-based compounds, and polyvinylidene fluoride(PVDF)-based compounds, and preferably, a mixture of polyvinylidene fluoride (PVDF) and polyurethane may be used, but the present invention is not limited thereto.

An average diameter of the nanofibers 120a constituting the nanoweb layer may be 0.1 μm or more and 2 μm or less. If the average diameter of the nanofibers 120a is less than 0.1 μm, the durability of the nanoweb layer may be reduced and a touch pressure of a certain level or more may not be detected. In addition, if the average diameter of the nanofibers 120a exceeds 2 μm, the compressive strength of the nanoweb layer may become excessively high and the sensitivity to touch pressure may be reduced.

The conductive powder 120b included in the first and second nanoweb layers 121 and 122 of the flexible touch sensor according to the present invention may include a conductivity-imparting agent. Examples of the conductivity-imparting agent may include at least one conductive metal selected from the group consisting of calcium(Ca), titanium (Ti), molybdenum(Mo), tungsten(W), iron(Fe), cobalt(Co), nickel(Ni), palladium(Pd), platinum(Pt), copper(Cu), silver (Ag), gold(Au), zinc(Zn), aluminum(Al), tin(Sn), lead(Pb), and alloys thereof, but are not limited thereto. In addition, other examples of the conductivity-imparting agent may include carbon-based non-metallic components such as carbon black, carbon nanotube, and graphene, and may be in the form of metal salts such as copper formate and nickel acetate, or the like, but are not limited thereto. The conductive powder 120b may be inserted into the nanoweb layer to be evenly distributed, whereby the change value of the capacitance can be further subdivided and accurately distinguished to be detected.

The nanoweb layers 121 and 122 may have a plurality of pores formed by crossing the plurality of nanofibers. Accordingly, the sensitivity of elastic deformation to touch pressure can be increased, and flexibility and resilience can be improved. The porosity of the nanoweb layer may be 10% or more and 80% or less, for example, 30% or more and 60% or less, but is not limited thereto. If the porosity of the nano web layer is less than 10%, the elasticity may be deteriorated, the delamination of the nano web layer may occur during electroless plating, and the durability may be deteriorated. If the porosity exceeds 80%, the durability, processability, and mechanical properties of the nano web layer may be reduced.

For example, the basis weight of the nanofiber web may be 2 to 100 g/m$^2$, for example, 10 g/m$^2$ to 20 g/m$^2$.

The average thickness of the nanoweb layers 121 and 122 may be 5 μm or more and 40 μm or less, for example, 10 μm or more and 30 μm or less, but is not limited thereto. If the average thickness of the nanoweb layer is less than 5 μm, the range of detectable touch pressure may be reduced, and the durability and mechanical properties of the nanoweb layer may be degraded. In addition, if the average thickness of the nanoweb layer exceeds 40 μm, the thickness of the body 10 may become thick, which may deteriorate process handling characteristics and may be disadvantageous for thinning the touch sensor.

The first circuit pattern layer 131 may be disposed under the first nanoweb layer 121. Also, the second circuit pattern layer 132 may be disposed above the second nanoweb layer 122. The first and second circuit pattern layers 131 and 132 form capacitance, and the flexible touch sensor 1 according to the present invention may detect the degree of touch pressure from the outside by detecting a change in the capacitance formed by the first circuit pattern layer 131 and the second circuit pattern layer 132.

The first circuit pattern layer 131 and the second circuit pattern layer 132 may be formed by a printed electronic technique using a conductive ink, and specifically, may be printed by any one of inkjet printing and flexography, but are not limited thereto. The conductive ink may be the same as the conductivity-imparting agent included in the nanoweb layer described above, but is not limited thereto.

The conductive ink may further include a binder and a dispersant in addition to the conductivity-imparting agent. The binder is not particularly limited as long as it can impart flexibility to the first and second circuit pattern layers 131 and 132. Examples of the binder may include an acrylic binder, an epoxy binder, a urethane binder, and a silicone binder, but are not limited thereto. By forming the first and second circuit pattern layers 131 and 132 using the conductive ink including the binder, even when deformation such as bending is applied to the touch sensor, the circuit pattern layer may not be short-circuited and may have excellent bending properties.

The circuit pattern layers 131 and 132 formed on the nanoweb layers 121 and 122 may have an average thickness of 0.1 μm or more and 20 μm or less from the surface of the nanoweb layer. If the circuit pattern layer has a thickness of less than 0.1 μm from the surface of the nanoweb layer, the stability of the electrical characteristics through the circuit pattern layer may be degraded. If the circuit pattern layer has a thickness of more than 20 μm from the surface of the nanoweb layer, cracks may occur in the nanoweb layer due to the excessive thickness of the circuit pattern layer, or segmentation of the nanofibers forming the nanoweb layer may occur, thereby reducing the elasticity, and when applied to small electronic products, it may be disadvantageous in terms of weight reduction and thinning.

The shape of the first circuit pattern layer 131 and the shape of the second circuit pattern layer 132 may be different from each other. The fact that the shapes of the first circuit pattern layer 131 and the second circuit pattern layer 132 are different from each other may mean that an area in which the first circuit pattern layer 131 and the second circuit pattern layer 132 overlap each other is implemented in a narrow pattern. That is, they are implemented in a pattern in which most of the second circuit pattern layer 132 is visible through the open area(perforated area) of the first circuit pattern layer 131.

For example, the first circuit pattern layer 131 and the second circuit pattern layer 132 may be connected to each other through a via hole 170 formed in the base layer 110 and the first and second nanoweb layers 121 and 122. The via hole 170 may be formed to penetrate the base layer 110 and the first and second nanoweb layers 121 and 122. A conductive material may be placed inside the via hole 170, and the material is not particularly limited as long as it can electrically connect the first circuit pattern layer 131 and the second circuit pattern layer 132. An example of the conductive material may be the above-described conductive ink, and when the first circuit pattern layer 131 and the second circuit pattern layer 132 are connected by the conductive ink, the body 10 can be formed through a flexible material, thereby having excellent flexibility.

Figure 4:
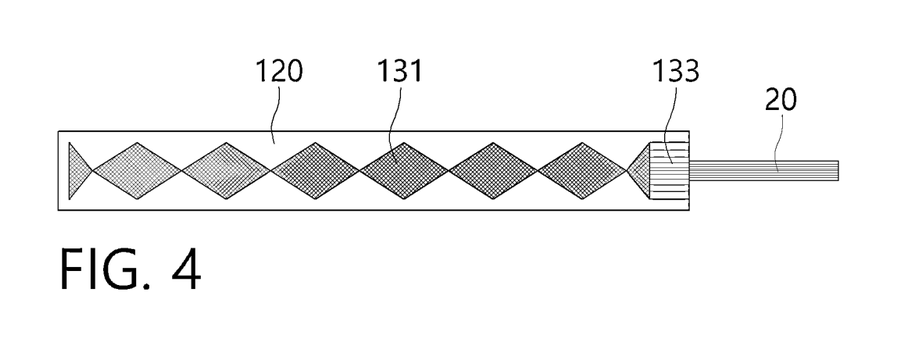
FIG. 4 is a diagram schematically illustrating a first circuit pattern layer applied to a flexible touch sensor according to an embodiment of the present invention.
Figure 5:
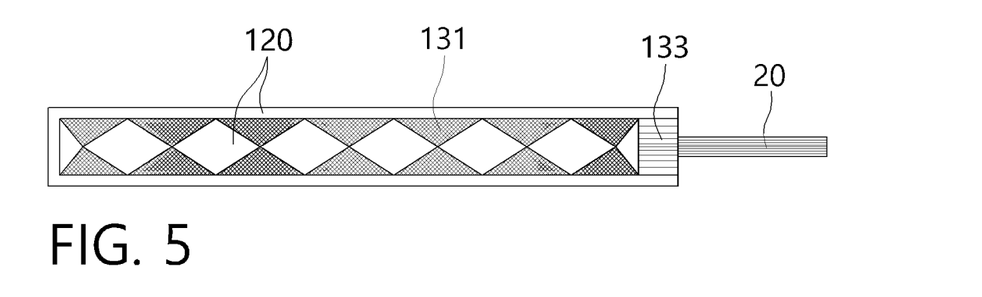
FIG. 5 is a plan view of a second circuit pattern layer of the flexible touch sensor of FIG. 4.

FIGS. 4 and 5 are plan views schematically illustrating the first and second circuit pattern layers of the flexible touch sensor according to an embodiment of the present invention. Referring to FIGS. 4 and 5, the first circuit pattern layer 131 may have a shape in which a certain shape, for example, a rhombus (◇) shape, is repeatedly arranged. In this case, other members may not be placed in an area where the rhombus(◇)-shaped first circuit pattern layer 131 is not disposed, and the nanoweb layer 120 may be exposed as is. In addition, the second circuit pattern layer 132 may be formed to face an area where the first circuit pattern layer 131 is not formed, and may be formed in a mesh pattern in which the rhombus(◇) shape is perforated at a certain interval.

Figure 6:
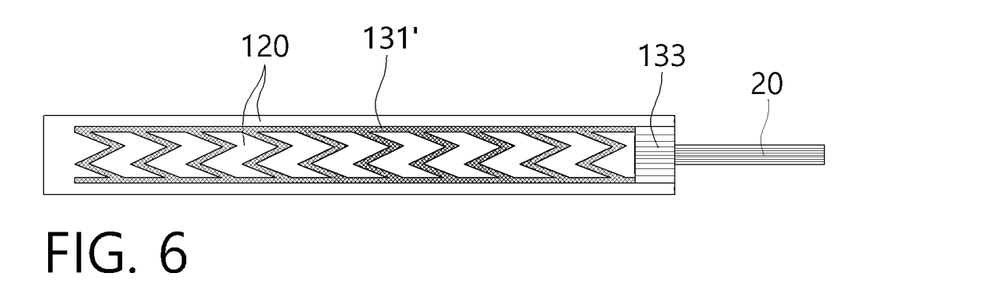
FIG. 6 is a plan view schematically illustrating a first circuit pattern layer of a flexible touch sensor according to another embodiment of the present invention.
Figure 7:
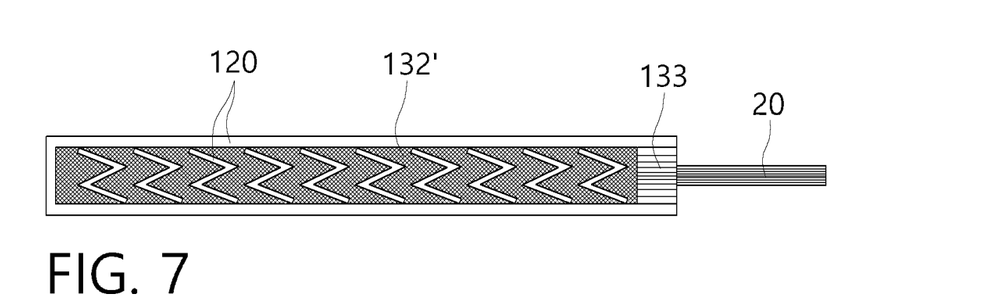
FIG. 7 is a plan view of a second circuit pattern layer of the flexible touch sensor of FIG. 6.

FIGS. 6 and 7 are plan views schematically illustrating the first and second circuit pattern layers 131' and 132' of the flexible touch sensor according to another embodiment of the present invention. Referring to FIGS. 6 and 7, the first circuit pattern layer 131' may have a shape in which a certain shape, for example, a zigzag shape, is repeatedly disposed. In this case, other members may not be placed in an area where the zigzag-shaped first circuit pattern layer 131' is not disposed, and the nanoweb layer 120 may be exposed as is. In addition, the second circuit pattern layer 132' may be formed to face an area where the first circuit pattern layer 131' is not formed, and may be formed in a mesh pattern in which the zigzag shape is perforated at a certain interval.

When the first circuit pattern layers 131 and 131' and the second circuit pattern layers 132 and 132' are formed as in the above embodiments, the first circuit pattern layers 131 and 131' and the second circuit pattern layers 132 and 132' may be connected to the flexible circuit board 20 through a connection member 133.

In this case, the shape of the first circuit pattern layer or the spacing between the open areas may be designed in various ways. The patterns of the first circuit pattern layer and the second circuit pattern layer may be formed in a rhombus shape(◇), a square shape(□), a circular shape(○), a zigzag shape, or the like, but are not limited thereto, and may have various shapes according to the purpose.

The flexible touch sensor according to the present invention may include a flexible printed circuit board (FPCB) 20 connected to any one of the first circuit pattern layer 131 and the second circuit pattern layer 132. The flexible circuit board 20 may have a structure such as a form in which a copper foil is bonded to a polyimide substrate, and any flexible substrate may be used without limitation. The flexible circuit board 20 may function as a connector connecting the flexible touch sensor 1 according to the present invention and an external circuit, and may implement the flexible touch sensor by having flexibility like the body 10 described above.

The flexible touch sensor according to the present invention may include a connection part 210 connecting the flexible circuit board to the above-described body 10. In this case, the connection part 210 may include an anisotropic conductive film(ACF). When the connection part 210 is connected to the body 10 using the anisotropic conductive film, the flexibility can be better than that of a method using solder or the like.

Figure 2:
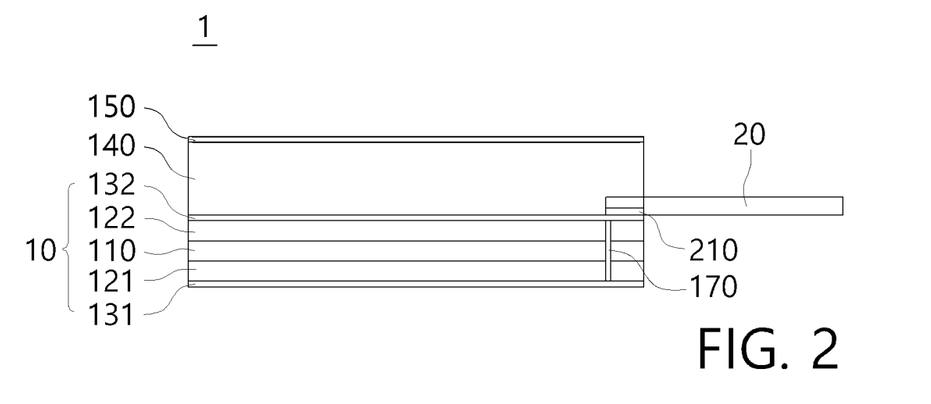
FIG. 2 is a cross-sectional view schematically illustrating a modified example of a flexible touch sensor according to the present invention.

FIG. 2 is a cross-sectional view schematically illustrating a flexible touch sensor according to an embodiment of the present invention. Referring to FIG. 2, a sponge layer 140 may be additionally disposed on the second circuit pattern layer 132 of the flexible touch sensor 1 according to the present example. The sponge layer 140 may be in a foam-molded form including at least one selected from the group consisting of polyurethane, styrene-butadiene rubber, polychloroprene rubber, nitrile rubber, butyl rubber, isoprene rubber, ethylene propylene rubber, silicone rubber, fluoro rubber, and acrylic rubber, but is not limited thereto. The sponge layer 140 is intended to provide a cushioning feeling to the touch sensor, and can provide a softer feeling to the user when applied to wearable devices, or the like.

In the above embodiment, a protective layer 150 may be additionally disposed on the sponge layer 140. As long as the protective layer 150 has insulating properties, its components are not particularly limited, and for example, the same components as those of the above-described base layer may be used. The protective layer 150 may include, for example, at least one selected from polyimide(PI), polyethylene terephthalate(PET), polyethylene naphthalate(PEN), and polyurethane(PU).

Figure 8:
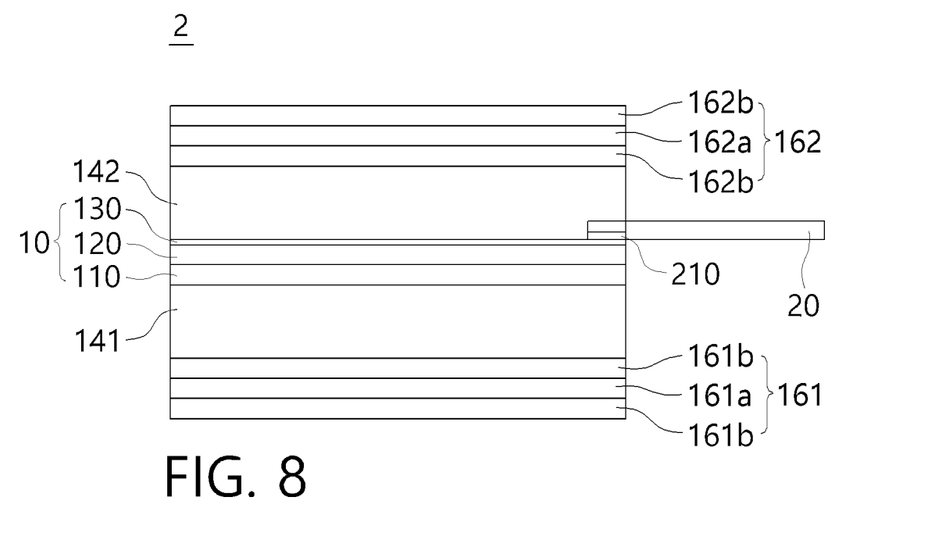
FIG. 8 is a cross-sectional view schematically illustrating a flexible touch sensor according to another embodiment of the present invention.

In another embodiment of the present invention, a flexible touch sensor 2 according to the present invention may include: a body 10 in which a base layer 110, a nanoweb layer 120, and a circuit pattern layer 130 are disposed to be sequentially stacked; an upper sponge layer 142 disposed on the body; an upper ground layer 162 disposed on the upper sponge layer 142; a flexible circuit board 20 connected to the circuit pattern layer 130 of the body 10; and a connection part 210 connecting the body 10 and the flexible circuit board 20, wherein at least a portion of the flexible circuit board 20 may be disposed between the upper sponge layer 142 and the circuit pattern layer 130, and wherein the connection part 210 may include an anisotropic conductive film.

In this case, the flexible touch sensor 2 may have flexibility to the extent that a crack having a length of 3 mm or more does not occur when wound around a cylindrical mandrel having a diameter of 4 mm. The flexibility may be a specific value according to the method of measurement standard JIS K5600-5-1.

In addition, the flexible touch sensor 2 according to the present embodiment may further include a lower sponge layer 141 and a lower ground layer 161 disposed under the base layer 110. In this case, the flexible touch sensor 2 of the present embodiment may have a structure in which the body 10 is disposed at the center, and the sponge layers 141 and 142 and the ground layers 161 and 162 are disposed both above and below the body.

In one example, the upper sponge layer 142 may be disposed to completely cover the circuit pattern layer 130. The fact that the upper sponge layer 142 is disposed to completely cover the circuit pattern layer 130 may mean a disposition in which the circuit pattern layer 130 disposed under the upper sponge layer 142 is not visible to the naked eye when the flexible touch sensor 2 according to the present invention is viewed from above the upper sponge layer 142.

The upper and/or lower ground layers 161 and 162 are intended to reduce noise, and may include a conductive metal such as copper or a conductive polymer such as PEDOT:PSS, but are not limited thereto. The upper and/or lower ground layers 161 and 162 may have a structure in which insulating layers 161b and 162b, conductive layers 161a and 162a, and insulating layers 161b and 162b are sequentially stacked. For example, the upper ground layer 162 may have a structure in which an upper insulating layer 162b, an upper conductive layer 161a, and an upper insulating layer 162b are sequentially stacked, and the lower ground layer 162 may have a structure in which a lower insulating layer 162b, a lower conductive layer 162a, and a lower insulating layer 162b are sequentially stacked. In this case, the insulating layer may include the same material as the above-described base layer.

For example, the upper conductive layer 162a, the lower conductive layer 161a, and the circuit pattern layer 130 may be connected to each other through a conductive material. The upper conductive layer 162a, the lower conductive layer 161a, and the circuit pattern layer 130 may be connected to each other using an external conductive line. In addition, the upper conductive layer 162a, the lower conductive layer 161a, and the circuit pattern layer 130 may be connected, for example, through a via hole(not shown) connecting the first and second circuit pattern layers described above, but are not limited thereto.

The base layer 110, the nanoweb layer 120, the circuit pattern layer 130, and the sponge layers 141 and 142 are the same as described above, and thus will be omitted.

Although an embodiment of the present invention have been described above, the spirit of the present invention is not limited to the embodiment presented in the subject specification; and those skilled in the art who understands the spirit of the present invention will be able to easily suggest other embodiments through addition, changes, elimination, and the like of elements without departing from the scope of the same spirit, and such other embodiments will also fall within the scope of the present invention.

INDUSTRIAL APPLICABILITY

According to the present invention, it is possible to provide a flexible touch sensor in which elastic recovery is facilitated by applying a flexible material including a nanoweb to a touch sensor having a stacked structure.

In addition, according to the present invention, it is possible to provide a flexible touch sensor that can be transformed into various shapes by increasing flexibility by applying an anisotropic conductive film to a connection part connecting a flexible circuit board and a sensor body.

The invention claimed is:

1. A flexible touch sensor including:
a body in which a first circuit pattern layer, a first nanoweb layer, a base layer, a second nanoweb layer, and a second circuit pattern layer are disposed to be sequentially stacked;
a sponge layer disposed to completely cover an upper surface of the second circuit pattern layer;
a ground layer disposed on the sponge layer, and electrically connected to the second circuit pattern layer;
a flexible circuit board, at least a portion of which is disposed between the sponge layer and the body, and connected to the second circuit pattern layers; and
a connection part comprising an anisotropic conductive film for connecting the body and the flexible circuit board,
wherein when wound around a cylindrical mandrel with a diameter of 4 mm, a crack having a length of 3 mm or more does not occur.

2. The flexible touch sensor according to claim 1, wherein the base layer includes at least one selected from polyimide (PI), polyethylene terephthalate(PET), polyethylene naphthalate(PEN), and polyurethane(PU).

3. The flexible touch sensor according to claim 1, wherein the average thickness of the base layer is 20 μm or more and 100 μm or less.

4. The flexible touch sensor according to claim 1, wherein the first nanoweb layer and the second nanoweb layer include nanofibers and conductive powders.

5. The flexible touch sensor according to claim 4, wherein the nanofibers include at least one selected from polyacrylonitrile nanofibers, polyvinylidene fluoride nanofibers, and polyvinylidene fluoride-trifluoroethylene(P(VDF-TrFE)) random copolymer nanofibers.

6. The flexible touch sensor according to claim 4, wherein the average diameter of the nanofibers is 0.1 μm or more and 2 μm or less.

7. The flexible touch sensor according to claim 1, wherein the average thickness of the first nanoweb layer and the second nanoweb layer is 5 μm or more and 40 μm or less.

8. The flexible touch sensor according to claim 1, wherein the porosity of the first nanoweb layer and the second nanoweb layer is 10% or more and 80% or less.

9. The flexible touch sensor according to claim 1, wherein the porosity of the first nanoweb layer and the second nanoweb layer is 30% or more and 60% or less.

10. The flexible touch sensor according to claim 1, wherein the average thickness of the first circuit pattern layer and the second circuit pattern layer is 0.1 μm or more and 20 μm or less.

11. The flexible touch sensor according to claim 1, wherein the shape of the circuit pattern of the first circuit pattern layer is different from the shape of the circuit pattern of the second circuit pattern layer.

12. A flexible touch sensor including:
a body in which a base layer, a nanoweb layer, and a circuit pattern layer are disposed to be sequentially stacked;
an upper sponge layer disposed on the body so as to completely cover the circuit pattern layer;
an upper ground layer disposed on the upper sponge layer;
a flexible circuit board, at least a portion of which is disposed between the upper sponge layer and the body, and connected to the circuit pattern layer of the body; and
a connection part comprising an anisotropic conductive film for connecting the body and the flexible circuit board,
wherein when wound around a cylindrical mandrel with a diameter of 4 mm, a crack having a length of 3 mm or more does not occur.

13. The flexible touch sensor according to claim 12, further including a lower sponge layer and a lower ground layer disposed under the base layer.

* * * * *